United States Patent
Ilkhanov et al.

(10) Patent No.: US 10,193,363 B2
(45) Date of Patent: Jan. 29, 2019

(54) HYBRID COUPLING FOR A SMART BATTERY SYSTEM

(71) Applicant: Bren-Tronics, Inc., Commack, NY (US)

(72) Inventors: Azer Ilkhanov, Brooklyn, NY (US); Peter J. Burke, East Northport, NY (US); Sai Fung, Melville, NY (US); Leo Brenna, Northport, NY (US)

(73) Assignee: Bren-Tronics, Inc., Commack, NY (US)

( * ) Notice: Subject to any disclaimer, the term of this patent is extended or adjusted under 35 U.S.C. 154(b) by 1140 days.

(21) Appl. No.: 14/507,898

(22) Filed: Oct. 7, 2014

(65) Prior Publication Data

US 2015/0042279 A1    Feb. 12, 2015

Related U.S. Application Data

(63) Continuation-in-part of application No. 29/439,313, filed on Dec. 10, 2012, now Pat. No. Des. 717,246.

(51) Int. Cl.
*H02J 7/00* (2006.01)

(52) U.S. Cl.
CPC .......... *H02J 7/0045* (2013.01); *H02J 7/0004* (2013.01); *H02J 2007/006* (2013.01)

(58) Field of Classification Search
CPC .............................. H02J 7/0045; H02J 7/0004
USPC ........................................................ 320/112
See application file for complete search history.

(56) References Cited

U.S. PATENT DOCUMENTS

| | | | |
|---|---|---|---|
| 6,262,562 B1 | 7/2001 | Cummings et al. | |
| 6,509,717 B2 | 1/2003 | Lee | |
| 2003/0186592 A1* | 10/2003 | Potega | G01K 1/02 439/676 |
| 2013/0181661 A1* | 7/2013 | Workman | H02J 7/0042 320/107 |
| 2014/0284998 A1* | 9/2014 | Brennan | B63B 35/00 307/9.1 |

OTHER PUBLICATIONS

SBS Implementers Forum, "System Management Bus (SMBus) Specification Version 2.0", Aug. 3, 2000.*
Benchmarq Microelectronics Inc., et al. "System Management Bus Specification, Revision 1.1," Dec. 11, 1998.

* cited by examiner

*Primary Examiner* — David V Henze-Gongola
(74) *Attorney, Agent, or Firm* — Keusey & Associates, P.C.

(57) ABSTRACT

A hybrid coupling for a smart battery system having two internal batteries. The hybrid power coupling includes a power coupling for connecting to the batteries and a data coupling for connecting with two bus devices that are also within the battery housing. The contacts of the digital data coupling are disposed in a circular configuration within the mating jack of the hybrid coupling. The data contacts are concentric with the D.C. battery contacts. The data contacts are retractable to automatically and selectively connect to a variety of battery-mounted jacks.

22 Claims, 3 Drawing Sheets

HYBRID COUPLING FOR A SMART BATTERY SYSTEM

CROSS-REFERENCE TO RELATED APPLICATIONS

This application is a continuation-in-part of co-pending U.S. patent application Ser. No. 29/439,313 filed Dec. 10, 2012.

BACKGROUND OF THE INVENTION

1. Field of the Invention

The invention relates to a hybrid coupling for a smart battery and a battery system incorporating such hybrid coupling.

2. The Prior Art

In the past, smart or rechargeable batteries were connected to external devices, like communications devices and chargers through power couplings. In certain demanding environments, such as military applications, it was desirable to accurately track battery state-of health, state-of-charge, usage statistics and the types of devices that were connected to the battery. Thousands of batteries, radios and chargers were deployed. Batteries that are not smart-enabled, are referred to in this application as "basic batteries." Rechargeable batteries may also be referred to as secondary batteries, compared to primary batteries which are single use.

When smart batteries were first introduced, they needed to be backward compatible to the basic radios and charges they might be connected to in the field. As a result, an independent bus connector was added to the battery that was separate from the power coupling. All devices could connect to the power coupling, and those connecting devices that were smart, could selectively connect to the separate bus connector. The provision of separate connectors has continued to many modern applications. For example, U.S. Pat. No. 6,262,562 shows in FIG. 1B the battery power coupling 158 separate from the system management (SM) Bus connectors 184. Also, U.S. Pat. No. 6,509,717 discloses a smart battery for a laptop. The prior art illustration of FIG. 2 shows the charging unit 7 separate from the SM Bus coupling between the smart batteries 3,4 and unit 5. FIG. 3B shows connector configurations for tandem smart battery packs. Finally, in FIG. 4 illustrating the invention, the charging unit 70 connects to the $V_{bat}$ battery separate from the SM bus connection between SM bus host 20, battery selecting unit 50 and batteries 30, 40.

Communications, formats and protocols used with smart batteries are derived from the SMBus specifications, that is Smart Battery System Specifications, System Management Bus Specifications Accordingly, it would be desirable to provide a single coupling that incorporates the SM Bus data coupling into multi-battery power coupling.

SUMMARY OF THE INVENTION

It is an object of the invention to provide a single coupling that incorporates the SM Bus data coupling into multi-battery power coupling.

It is another object to configure the hybrid coupling with a full-time power coupling and optional data coupling.

It is a further object to provide multi-functional male data contacts.

It is another object to arrange the power contacts and data contacts in concentric rings on the jack.

It is a further object to position the data contacts equidistantly between adjacent power contacts to reduce interference therebetween.

These and other related objects are achieved by a smart battery system according to one embodiment of the invention. The battery system includes a single hybrid coupling mounted to the battery housing. The battery housing containing a first battery, a second battery, and first and second memory locations for storing data about the first and second batteries respectively. A single hybrid coupling having a mating jack includes a power coupling and a data coupling. The power coupling including two pair of D.C. battery conductors disposed in a first circular configuration within the mating jack for electrically connecting an external device to the first and second batteries. The data coupling provides two system management buses for communicating data between the external device and the first and second memory locations respectively. The data coupling has two pair of digital bus conductors disposed in a second circular configuration within the mating jack. The second circular configuration is concentric with the first circular configuration.

Each pair of digital bus conductors consists of a clock line operating at a minimum frequency of 10 KHz and a data line forming one system management bus. The clock line and the data line pulse between a low state having a voltage between −0.5 and 0.8 volts and a high state having a voltage between 2.1 and 5.5 volts. The dock lines and data lines are bi-directional lines connected to a power supply through one of a pull-up resistor or a current source. The external device may be a battery charger.

Each pair of D.C. battery conductors provides an open circuit voltage from the respective battery of between about 10 V to about 17 V. The external device comprising a device requiring battery power. The first and second circular configurations have a common center point. The battery conductors are located on spaced radial lines extending outwardly from the center point. The digital bus conductors are disposed in between the radial lines. The digital bus conductors are equidistantly disposed between adjacent radial lines to reduce interference between the power coupling and the data coupling.

The power coupling includes an additional fifth battery conductor in the first circular configuration, with equal angular spacing between all of the five battery conductors. The data coupling includes an additional fifth conductor in the second circular configuration, with equal angular spacing between all of the five data coupling conductors. The power coupling includes a further sixth battery-type conductor disposed in the center of the circular configuration at the center point. The fifth conductor of the data coupling communicates a charge enable signal from the external device comprising a charger. The sixth conductor of the power coupling communicates the return of the charge enable signal to the external device.

The five battery conductors alternate in angular positions that sweep around the center point with the five bus conductors at approximately 36 degree intervals. The five data conductors are disposed concentrically between the sixth central battery-type conductor and the five battery conductors in the first circular configuration. Alternatively, the five battery conductors are disposed concentrically between the sixth central battery-type conductor and the five data conductors.

The power coupling and the data coupling terminate in contacts that are arranged in the jack starting from the 12:00 position and moving clockwise as follows:

a first battery conductor;
a first digital bus conductor;
a first digital bus conductor;
a second battery conductor;
a first battery conductor;
a second digital bus conductor;
a second battery conductor; and
a second digital bus conductor.

The power coupling and the data coupling terminate in contacts that are arranged in the jack starting from the 12:00 position and moving clockwise as follows:
a first battery conductor;
a first digital bus clock data conductor;
an additional battery-type conductor;
a first digital bus data conductor;
a second battery conductor;
an additional data-type conductor;
a first battery conductor;
a second digital bus clock data conductor;
a second battery conductor; and
a second digital bus data conductor.

The external device is a charger. A further battery-type conductor is disposed in the center of the jack. An additional data-type conductor provides a charge enable signal and the further battery-type conductor provides a charge enable return signal. The five data conductors are disposed concentrically between the further central battery-type conductor and the five battery conductors in the first circular configuration. The five battery conductors are disposed concentrically between the further central battery-type conductor and the five data conductors.

Another aspect of the invention includes a hybrid coupling having battery conductors arranged in a first circular configuration, and data couplings arranged in a second circular configuration. The first circular configuration is arranged concentric to the second circular configuration. The power contacts and the data contacts alternate in angular positions around the circular configuration.

BRIEF DESCRIPTION OF THE DRAWINGS

The advantages, nature, and various additional features of the invention will appear more fully upon consideration of the illustrative embodiments now to be described in detail in connection with accompanying drawings. In the drawings wherein like reference numerals denote similar components throughout the views.

DETAILED DESCRIPTION OF THE PREFERRED EMBODIMENTS

Figure 1:
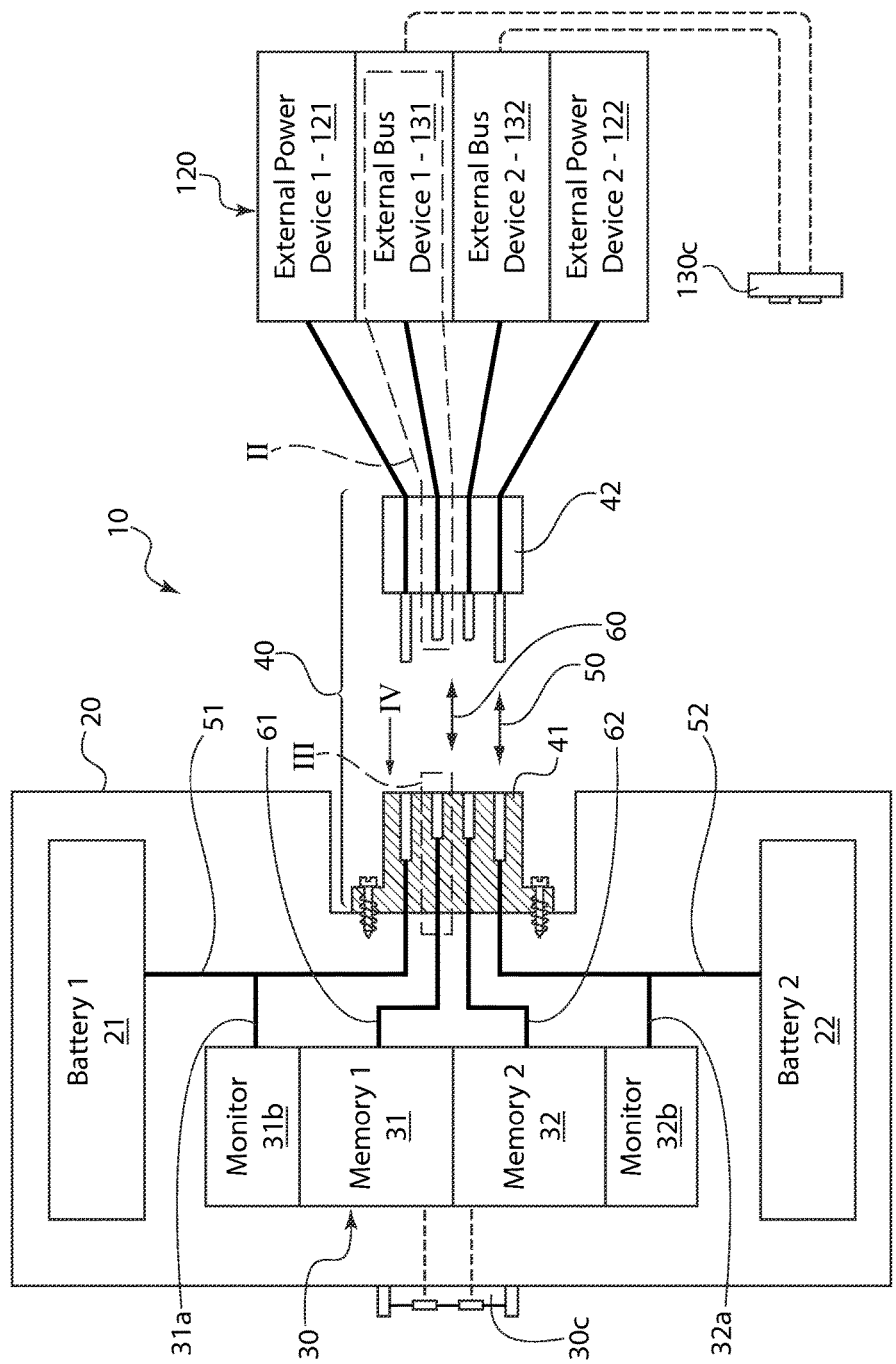
FIG. 1 is a schematic drawing of an embodiment of the smart battery system according to the invention.

Turning now in detail to the drawings, and in particular FIG. 1, there is shown a schematic overview of the smart battery system 10 of the invention. Within the context of this application "smart" also means "rechargeable". The battery system shown is a smart battery, meaning the battery has built-in logic and/or memory that tracks and/or stores statistics about the battery. These statistics may include one or more of battery state-of-charge, battery state-of-health, usage data, types of equipment connected to the battery, and charge history. The hybrid coupling 40 according to the invention is always used with a smart battery system containing two batteries. The hybrid coupling has particular utility when used with a smart battery. One embodiment of the hybrid coupling that includes pogo pins can be used with smart batteries or non-smart batteries.

Smart battery system 10 includes a battery housing 20 that contains a first battery 21, a second battery 22, and a bus device 30. In all cases these internal batteries or cells be rechargeable batteries or cells. A first pair of battery conductors 51 which transmits power to and from first battery 21 terminates in a pair of contacts within a jack 41. A second pair of battery conductors 52 which transmits power to and from second battery 22 terminates in a further pair of contacts within jack 41. Previously jack 41 functioned exclusively as a power coupling to the batteries. The pair of conductors 51, 52 actually terminates in a pair of contacts, representing one positive and one negative contact of the respective battery. However, just one female contact is shown, for the sake of clarity. The contacts described in relation to the invention could be male or female contacts. The pair of conductors 51 and 52 constitutes the power coupling 50 portion of the hybrid coupling.

Housing 20 also contains a bus device 30 that is capable of operating as a master device or a slave device. Bus device 30 includes a first memory location 31 with a first battery monitor connection 31a. The connection 31a allows the logic or monitor circuit 31b to monitor first battery 21 and store activity and usage data within first memory location 31. Connection 31a includes two leads coupled to the pair of battery conductors 51.

Bus device 30 also includes a second memory location 32 with a second battery monitor connection 32a. The connection 32a allows the monitor circuit 32b to monitor second battery 22 and store activity and usage data within second memory location 32. This arrangement of monitoring and storing battery activity and usage data is typical of operations in many smart batteries. Connection 32a includes two leads coupled to the pair of battery conductors 52.

According to the prior art, in the era before smart batteries, an external device 120 would connect to the batteries 21, 22 via a power coupling 50. In the case of military equipment, thousands of batteries, communications devices, like radios and chargers were made and deployed in the field. When smart batteries were first introduced, they provided a bus connector 30c that was separate from the power coupling 50. In this manner, a radio without a bus device could connect to the battery via power coupling 50. Similarly, a charger could connect to the batteries with power coupling 50. If the charger had a smart management system, its bus connector 130c would connect to the bus device 30 by its bus connector 30c. By having a bus connector 30c separate from the power coupling 50, the smart battery could connect to a variety of smart and non-smart devices. In other words, the power coupling would always be connected with the data coupling being optionally connected if a smart device was present. However, the data coupling would have to be separately plugged in. According to the invention, memory locations 31 and 32 can be accessed by a first and second pair of digital bus connectors 61 and 62. These conductors terminate in contacts that are disposed within jack 41.

External device 120 refers generically to external power devices 121, 122 that connect to batteries 21, 22. External power devices could be chargers or devices that require power, like radios or other communications equipment.

External power devices may be equipped with external bus devices 131 and 132. Previously such bus equipped devices had a separate bus connector 130c that connected to the smart battery system 10 via its own separate jack 30c.

Figure 2A:
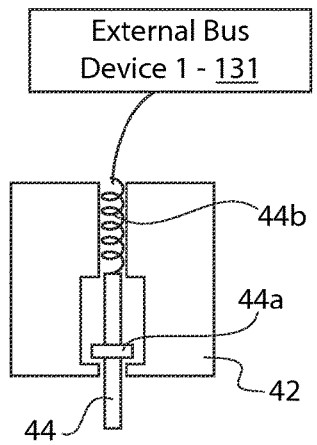
FIGS. 2A and 2B are enlarged partial cross-sectional views of the mating jack showing a pogo pin in an extended state and retracted state, respectively.
Figure 2B:
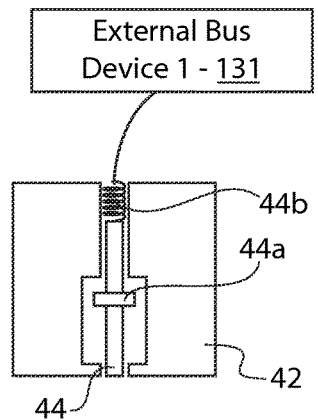

For exemplary purposes, jack 41 is shown with female contacts and mating jack 42 is shown with male contacts. The male contacts for the power coupling 50 are fixed, stationary prongs. The male contacts for the data coupling 60 are also shown in FIG. 1 as fixed, stationary prongs. In an alternate embodiment, the data coupling portion of mating jack 42 is shown in FIGS. 2A and 2B with one male pogo pin 44. FIGS. 2A and 2B are sections of mating jack 42 as designated with dotted line in FIG. 1 and labeled II. One pogo pin would be provided for each contact within the data coupling. Pogo pin 44 is biased in an extended position by spring 44b as shown in FIG. 2A. Upon application of sufficient axial pressure to overcome the biasing force of spring 44b, pogo pin 44 can be slide back into mating jack 42 into a retracted position as shown in FIG. 2B. Pogo pin slides within a sleeve having shoulders at both ends. Pogo pin includes a retention collar 44a larger than the shoulders to restrict the axial motion of the pogo pin to the extended and retracted positions shown in FIGS. 2A and 2B, respectively.

The wire to External Bus Device 131 can be electrically connected to pogo pin 44 via the metal spring. The spring would be suitable crimped or soldered at one end to the wire and at the other end to the base of pogo pin. Alternatively, the wire could be soldered or crimped to retention collar 44a, or another part of pogo pin below the collar. In this instance, the wire would be provided with a degree of slack to allow it to move back and forth as the pogo pin is retracted and extended in use.

Figure 3A:
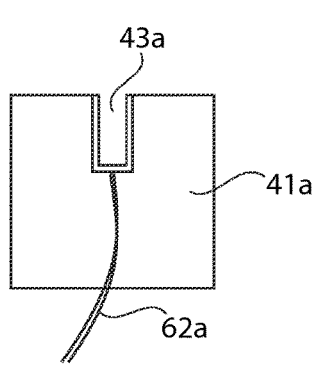
FIGS. 3A, 3B and 3C are enlarged partial cross-sectional views of the jack showing various embodiments for the female data contact.

Added functionality and flexibility is gained by equipping the data coupling 60 with pogo pins 44 on the mating jack 42. Functionally, the pogo pins provide reverse compatibility to older style batteries, that is, batteries without system buses or batteries with the old style bus connector 30c. As for flexibility, the pogo pins can electrically connect with two different types of contacts on jack 41. FIGS. 3A. 3B and 3C are sections of jack 41 as designated with dotted line in FIG. 1 and labeled III. FIG. 3A shows a female slot 43a as the connector on jack 41a that is connected to one of the digital bus conductors 62a. Female slot 43a can mate with a fixed, stationary prong or pogo pin 44 in the extended position as shown in FIG. 2A. In addition, the female slot 43a on jack 41a is non-interfering if it is desired to couple an external device 120 that does not include a system bus.

Figure 3B:
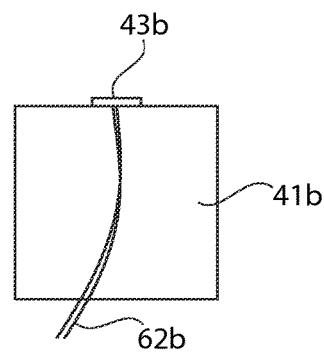

FIG. 3B shows a contact pad 43b made from a conductive, metal material that is connected to one of the digital bus conductors 62b. Contact pad 43b can mate with pogo pin 44 in the retracted position as shown in FIG. 2B. In addition, the contact pad 43b on jack 41b is non-interfering if it is desired to couple an external device 120 that does not include a system bus. FIG. 3B shows a jack 41c with no data contact 43c from a basic battery, i.e. a battery that does not include a system bus. The no data contact surface 43c would cause pogo pin to retract to the position shown in FIG. 2B where it would reside without interfering with the operation of the power coupling.

By utilizing a pogo pin as the male contact on the mating jack, the data coupling can accommodate a variety of connection options. The hybrid coupling makes the standard battery connections and automatically configures the pogo pin to an extended or retracted position, by simply plugging the mating jack 42 into the jack 41. Jack 41 will include a female slot 43a, a contact pad 43b or no data contact 43c.

Figure 3C:
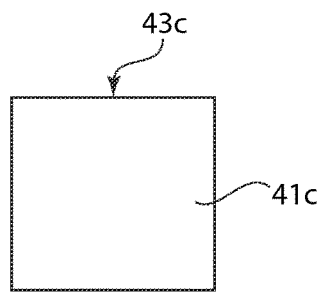

Pogo pin 44 will remain extended to plug into female slot 43a, as shown in FIG. 3A. Pogo pin 44 will retract form an electrical connection with contact pad 43b, as shown in FIG. 3B. Pogo pin 44 will retract without connection when it is pressed against the no contact surface 43c of FIG. 3C.

Figure 4:
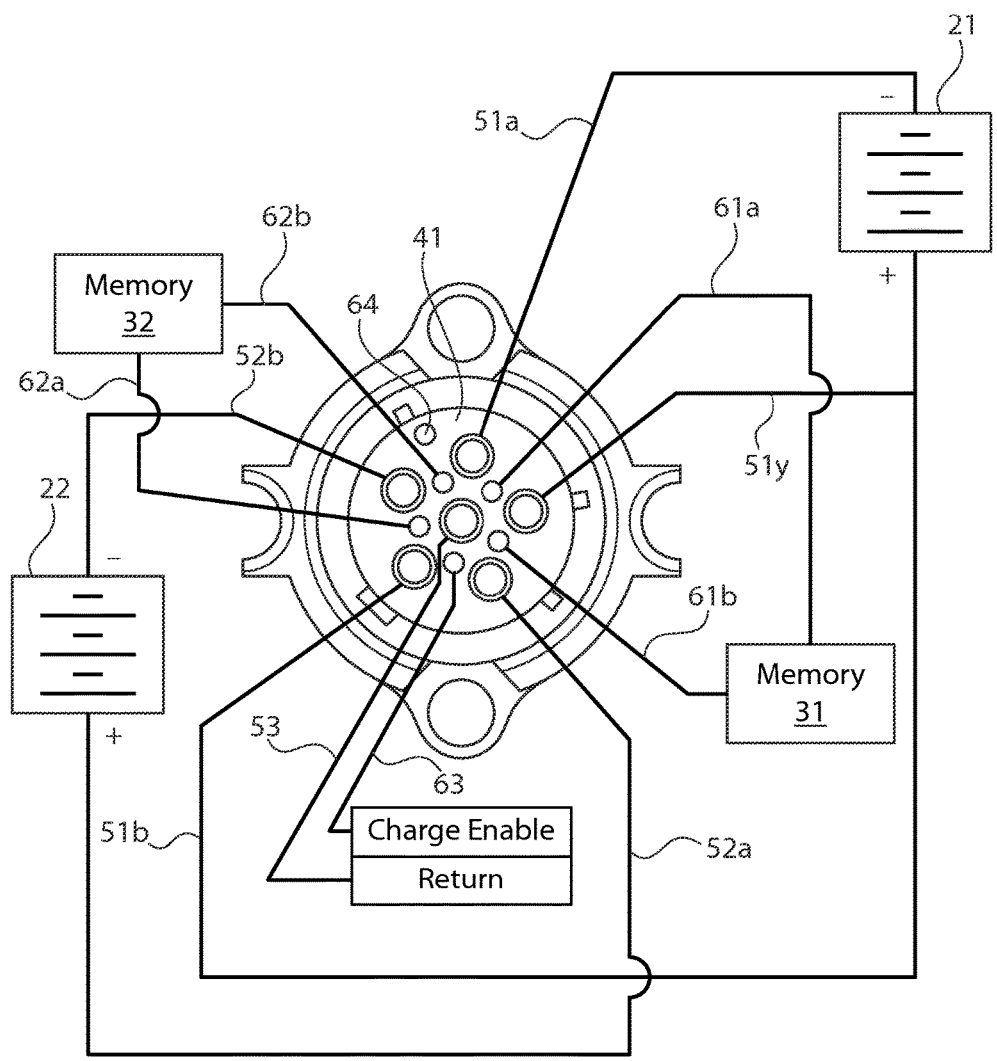
FIG. 4 is front side elevational view of the hybrid jack.

FIG. 4 shows an axially view of jack 41 with the female slots from the direction of the arrow labeled IV. The jacks include five larger power coupling 50 jacks alternating with five smaller data coupling 60 jacks plus a sixth larger power coupling 50 jack in the center.

Starting from the 12:00 position and moving clockwise, the jacks are assigned to the various conductors as follows:
 first battery conductor 51a
 first digital bus conductor 61a
 additional battery conductor 51y
 first digital bus conductor 61b
 second battery conductor 52a
 additional data-type conductor 63
 first battery conductor 51b
 second digital bus conductor 62a
 second battery conductor 52b
 second digital bus conductor 62b.

In the center there is a further battery-type conductor 53.

The first pair of battery conductors 51a and 51b are connected to the first battery 21. Optionally additional battery conductor 51y is connected to battery conductor 51b inside the battery. The second pair of battery conductors 52a and 52b are connected to the second battery 22. Conductors 51a and 51b are part of a matched pair, with one being positive and the other being negative. Conductors 52a and 52b are part of a matched pair, with one being positive and the other being negative.

The first pair of digital bus connectors 61a and 61b are connected to first memory location 31. The second pair of digital bus connectors 62a and 62b are connected to the second memory location 32. Additional data-type conductor 63 may be used as the charge enable signal, with further battery-type conductor 53 operating as the return of the charge enable signal. The charge enable circuit is used exclusively when chargers are connected to jack 41. It functions as a safety device to limit the introduction of high current to the batteries unless an approved charger is connected. This circuit is enabled by applying 5 V through a 470 ohm resistor.

In one practical embodiment, the first digital bus conductors are configured with 61a being the clock line and 61b as the data line. In the second digital bus conductors 62a is the clock line and 62b is the data line. FIG. 4 shows power contacts 51a, 51y, 52a, 51b and 52b in a first circular configuration. Data contacts 61a, 61b, 63, 62a and 62b are shown in a second circular configuration. In the illustrated embodiment, the second circular configuration of data contacts is disposed radially inward of the first circular configuration of power contacts. An alternate data contact location 64 is shown where the data contact is radially outward of the first circular configuration of power contacts. The five data contacts 61a, 61b, 63, 62a and 62b can alternatively be placed in a third circular configuration around the perimeter of jack 41. In both cases the data contacts with either the second and third circular configurations are concentric with the power contacts of the first circular configuration.

During communication across the data coupling, the system management bus utilizes bytes consisting of 8 bits. Following each byte transferred is a required acknowledge bit. The most significant bit (MSB) is transferred first. The master device generates the acknowledge related clock pulse. Communications, formats and protocols conform to the SMBus specifications, that is Smart Battery System Specifications, System Management Bus Specifications, Revision 1.1, Dec. 11, 1998, and posted at www.sbs-forum.org, the entire contents of both of which are incorporated herein by reference thereto. The presence of devices on the bus is detected by signaling.

By combining the data coupling and the power coupling into a single hybrid coupling, the data coupling will always be connected when the battery is plugged into an external device 120. Furthermore, if the data coupling is equipped with pogo pins, the hybrid coupling can be universally plugged into basic batteries, and smart batteries with female contacts configured as slots or pads. In addition, the charge enable signal can be communicated to and from the battery via a single jack. With five power contacts and five data contacts the approximate angular measure between each individual contact is 36 degrees. The angular measure between adjacent power contacts is 72 degrees. The angular measure between adjacent data contacts is also 72 degrees. The 72 degree angular measures between adjacent power contacts and adjacent data contacts overlap by 36 degrees. The angular measurements remain the same if the data contacts are moved to the perimeter of the jack 41 as illustrated by the alternate data contact location 64. The hybrid coupling eliminates the need to manufacture and maintain prior art bus connectors 30c and 130c. By minimizing the overall number of connectors, the moisture resistance of the system is increased.

Having described preferred embodiments for (which are intended to be illustrative and not limiting), it is noted that modifications and variations can be made by persons skilled in the art in light of the above teachings. It is to be understood that the polarity of the conductors has been labeled for descriptive purposes and the polarity may be switched without detracting from the spirit of the invention. The data coupling may be provided in alternate configurations that conform to the current and future system management bus specifications. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A smart battery system comprising:
   a battery housing containing a first battery, a second battery, and first and second memory locations for storing data about said first and second batteries respectively; and
   a single hybrid coupling having a mating jack comprising
   (i) a power coupling including two pairs of D.C. battery conductors disposed in a first circular configuration within said mating jack for electrically connecting an external device to said first and second batteries; and
   (ii) a data coupling providing two system management buses for communicating data between the external device and said first and second memory locations respectively, wherein said data coupling has two pairs of digital bus conductors disposed in a second circular configuration within said mating jack, wherein said second circular configuration is concentric with said first circular configuration,
   wherein said power coupling and said data coupling terminate in contacts that are arranged in the jack starting from the 12:00 position and moving clockwise as follows:
      a first battery conductor of said first pair of D.C. battery conductors;
      a first digital bus clock data conductor of said first pair of digital bus conductors;
      an additional battery-type conductor;
      a first digital bus data conductor of said first pair of digital bus conductors;
      a first battery conductor of said second pair of D.C. battery conductors;
      an additional data-type conductor;
      a second battery conductor of said first pair of D.C. battery conductors;
      a second digital bus clock data conductor of said second pair of digital bus conductors;
      a second battery conductor of said second pair of D.C. battery conductors; and
      a second digital bus data conductor of said second pair of digital bus conductors, and
   wherein the external device comprises a charger, and further comprising a further battery-type conductor in the center of the jack, and wherein said additional data-type conductor provides a charge enable signal and said further battery-type conductor provides a charge enable return signal.

2. The system of claim 1, wherein each pair of digital bus conductors consists of a clock line operating at a minimum frequency of 10 KHz and a data line forming one system management bus.

3. The system of claim 2, wherein said clock line and said data line pulse between a low state having a voltage between −0.5 and 0.8 volts and a high state having a voltage between 2.1 and 5.5 volts.

4. The system of claim 3, wherein said clock lines and said data lines are bi-directional lines connected to a power supply through one of a pull-up resistor or a current source.

5. The system of claim 4, further including an external device comprising a battery charger.

6. The system of claim 3, wherein each pair of D.C. battery conductors provides an open circuit voltage from the respective battery of between about 10 V to about 17 V.

7. The system of claim 6, further including an external device comprising a device requiring battery power.

8. The system of claim 6, wherein said first and second circular configurations have a common center point; and wherein said battery conductors are located on spaced radial lines extending outwardly from the center point; and wherein said digital bus conductors are disposed in between said radial lines.

9. The system of claim 8, wherein said digital bus conductors are equidistantly disposed between adjacent spaced radial lines to reduce interference between said power coupling and said data coupling.

10. The system of claim 9, wherein said power coupling includes an additional fifth battery conductor in the first circular configuration, with equal angular spacing between all of said five battery conductors.

11. The system of claim 10, wherein said data coupling includes an additional fifth conductor in the second circular configuration, with equal angular spacing between all of said five digital bus conductors.

12. The system of claim 11, wherein said power coupling includes a further sixth battery-type conductor disposed in the center of the circular configuration at the center point.

13. The system of claim 1, wherein said five data conductors are disposed concentrically between said further central battery-type conductor and said five battery conductors in the first circular configuration.

14. The system of claim 1, wherein said five battery conductors are disposed concentrically between said further central battery-type conductor and said five data conductors.

15. A smart battery system comprising:
a battery housing containing a first battery, a second battery, and first and second memory locations for storing data about said first and second batteries respectively; and
a single hybrid coupling having a mating jack comprising
(i) a power coupling including five equal angular spaced D.C. battery conductors disposed in a first circular configuration within said mating jack for electrically connecting an external device to said first and second batteries, wherein each pair of D.C. battery conductors provides an open circuit voltage from the respective battery of between about 10 V to about 17 V, and a sixth battery conductor disposed in the center of the circular configuration;
(ii) a data coupling providing two system management buses for communicating data between the external device and said first and second memory locations respectively, wherein said data coupling has two pairs of digital bus conductors and a fifth digital bus conductor disposed in a second circular configuration within said mating jack with equal angular spacing between all of said five digital bus conductors, wherein said second circular configuration is concentric with said first circular configuration, wherein each pair of digital bus conductors consists of a clock line operating at a minimum frequency of 10 KHz and a data line forming one system management bus, wherein said clock line and said data line pulse between a low state having a voltage between −0.5 and 0.8 volts and a high state having a voltage between 2.1 and 5.5 volts,
wherein said first and second circular configurations have a common center point; and
wherein said battery conductors are located on spaced radial lines extending outwardly from the center point and wherein said digital bus conductors are equidistantly disposed in between adjacent spaced radial lines to reduce interference between said power coupling and said data coupling,
wherein said fifth digital bus conductor of said data coupling communicates a charge enable signal from said external device comprising a charger, and the sixth battery conductor of said power coupling communicates the return of the charge enable signal to said external device.

16. The system of claim 15, wherein said five equal angular spaced battery conductors alternate in angular positions that sweep around said center point with said five digital bus conductors at approximately 36 degree intervals.

17. The system of claim 16, wherein said five digital bus conductors are disposed concentrically between said sixth battery conductor and said five equal angular spaced battery conductors in the first circular configuration.

18. The system of claim 16, wherein said five equal angular spaced battery conductors are disposed concentrically between said sixth battery conductor and said five digital bus conductors.

19. A smart battery system comprising:
a battery housing containing a first battery, a second battery, and first and second memory locations for storing data about said first and second batteries respectively; and
a single hybrid coupling having a mating jack comprising
(i) a power coupling including two pairs of D.C. battery conductors disposed in a first circular configuration within said mating jack for electrically connecting an external device to said first and second batteries, wherein said first circular configuration only contains D.C. battery conductors; and
(ii) a data coupling providing two system management buses for communicating data between the external device and said first and second memory locations respectively, wherein said data coupling has two pairs of digital bus conductors and includes a fifth digital bus conductor disposed in a second circular configuration within said mating jack, wherein said second circular configuration is concentric with said first circular configuration,
wherein said fifth digital bus conductor communicates a charge enable signal from said external device comprising a charger, and wherein said power coupling includes a sixth battery-type conductor to communicate the return of the charge enable signal to said external device.

20. The smart battery system of claim 19, wherein each of said digital bus conductors is equidistantly disposed between two adjacent D.C. battery conductors to reduce interference between said power coupling and said data coupling.

21. The smart battery system of claim 19, wherein said power coupling includes a fifth D.C. battery conductor, wherein each of said five digital bus conductors is disposed equidistantly between two adjacent D.C. battery conductors to reduce interference between said power coupling and said data coupling.

22. The smart battery system of claim 21, wherein said five D.C. battery conductors alternate in angular positions with said five digital bus connectors.

\* \* \* \* \*